Jan. 20, 1948.                     E. H. SIMPSON                         2,434,675
                      GOVERNOR FOR POWER DRIVEN AIR SUPPLY UNITS
                            Filed Feb. 5, 1944                    2 Sheets-Sheet 1

Inventor
ERNEST H. SIMPSON,
By C. E. Herrstrom & H. E. Thibodeau
Attorneys

Jan. 20, 1948.  E. H. SIMPSON  2,434,675
GOVERNOR FOR POWER DRIVEN AIR SUPPLY UNITS
Filed Feb. 5, 1944  2 Sheets-Sheet 2

FROM FRAME
RESERVOIR

Inventor
ERNEST H. SIMPSON,
By C. E. Herrstrom & H. E. Thibodeau
Attorneys

Patented Jan. 20, 1948

2,434,675

UNITED STATES PATENT OFFICE 2,434,675

GOVERNOR FOR POWER DRIVEN AIR SUPPLY UNITS

Ernest H. Simpson, Gettysburg, Pa.

Application February 5, 1944, Serial No. 521,270

2 Claims. (Cl. 230—9)

(Granted under the act of March 3, 1883, as amended April 30, 1928; 370 O. G. 757)

The invention described herein may be manufactured and used by or for the Government for governmental purposes without the payment to me of any royalty thereon.

This invention relates to a power driven supply unit.

The primary object is to provide a control to reduce the speed of the engine when not under load or compressing, and one that becomes operative only when the engine is not under load, thus permitting the engine to idle.

In a gasoline driven air supply unit, so far as I know, and with which my occupation familiarizes me, there is no effective means for reducing the speed of the engine when not under load, or when the reserve air pressure in the reservoir is not being used.

My improvement is applied to a unit in which the speed of the motor is automatically controlled by a governor, which speed remains constant under varying load conditions, including zero load. I propose to lower the speed of the motor under zero load conditions.

As a part of the unit mentioned there is a compression governor designed, when the engine is compressing, to control the pressure in the storage reservoir by stopping compression when the air pressure rises above a predetermined range, say for high 125 to 130 pounds, and low 105 to 115 pounds, the speed of the engine remaining constant. It is this constant speed of the engine, under the conditions recited, that I propose to reduce when the compressor is not delivering pressure to the storage reservoir, and provide for this purpose the devices shown in the accompanying drawings, in which.

Figure 1:
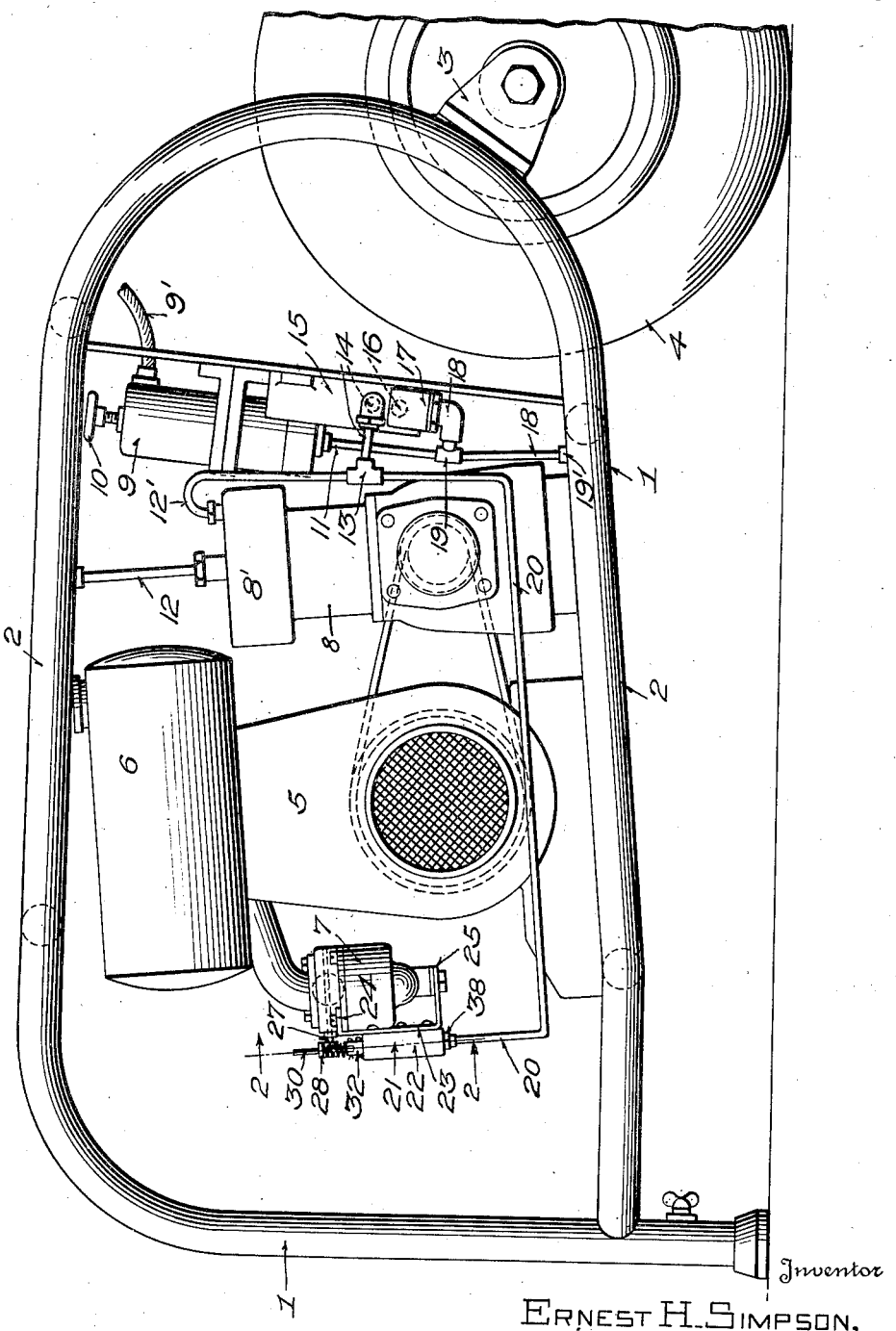
Figure 1 is a side elevation of a portable air supply unit very generally like one in use for inflating pneumatic tires and for operating grease guns, etc.

In the drawing there is shown, Figure 1, a side elevation of a unit generally like one in use, and which I have selected to show the application of the invention. This unit includes a compressor, the delivery head of which contains a valve mechanism for unloading the compressor when the pressure in the reservoir reaches a predetermined point. This mechanism is no part of my invention. The unit also includes a pressure governor, which is also no part of my invention. I have, however, shown schematically in Figure 6 the governor mentioned, in order to show more clearly the application of my invention.

In the drawing, I designates the air pressure reservoir. It comprises a tubular frame 2. Figure 1 of the drawing being a true side elevation there is but one section of the frame shown, but in the actual unit there are two such sections in complete parallelism interconnected with the pressure producing mechanism, so as to produce a reservoir of a capacity adequate to the requirements of the unit. To the front portions of the frame sections are attached oppositely disposed brackets such as 3 between which there is journalled the wheel 4 by the aid of which the whole unit is made conveniently portable.

The engine is indicated by 5. This is supported and braced in the frame in any convenient manner, and has adjacent thereto a fuel tank 6.

Connected with the engine in the usual way is the usual carburetor 7 with which my invention is essentially concerned, not in the carburetor construction but in its control through the manipulation of its butterfly or throttle valve, as will appear.

There is a compressor 8 suitably supported in the frame adjacent the engine and geared with the engine by a suitable gearing, such as a belt. A feed valve 9, of known type, is supported between the frame sides and provided with a hand wheel operated to manually regulate the pressure delivered through the inflation hose 9' to a tire, grease gun or the like.

Connected with the feed valve is a pipe 11 leading to the pressure reservoir 1, from which, for all purposes for which the unit is intended, the pressure is primarily delivered.

Connected with the delivery head 8' of a compressor 8 is a pipe 12 leading directly to the reservoir, and another pipe 12' connected with the unloading valve mechanism of the compressor head and extending downwardly to a T, 13 into which is threaded a laterally extending pipe 14 leading to compressor governor 15. Threaded into the wall of the governor is a fitting 16, Figure 6, usually including a strainer 17, and a pipe 18 connected as at 19 to the pipe 11 leading to the reservoir, and tapped therein as at 19'.

Figure 2:
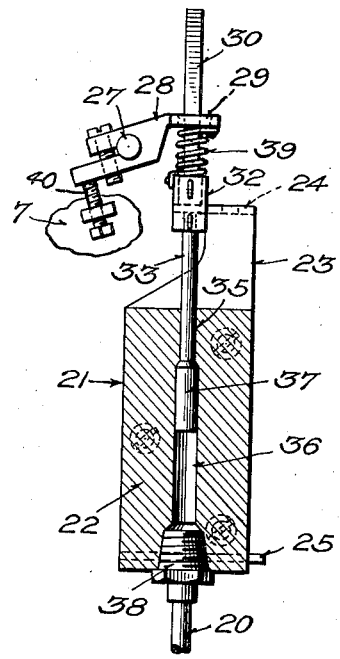
Figure 2 is a view on line 2—2 of Figure 1 partly in section and partly in elevation, of the means for operating the usual butterfly valve in the carburetor of the engine, the positions of the parts being those to reduce the gas supply to that under which the engine idles, i. e., when not compressing.
Figure 3:
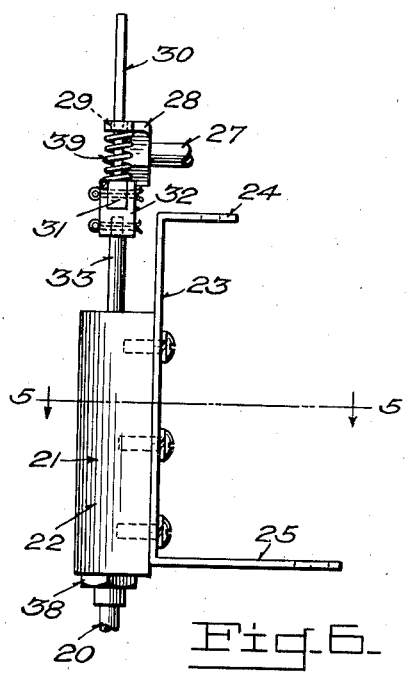
Figure 3 is an elevation at right angles to Figure 2, showing more clearly the bracket by which the butterfly valve operating device may be conveniently attached to the carburetor.
Figure 4:
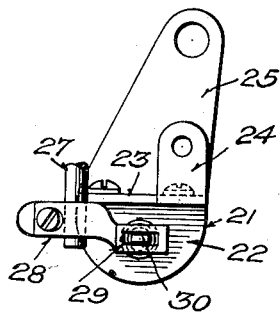
Figure 4 is a top plan view of Figure 3.
Figure 5:
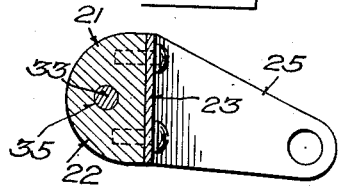
Figure 5 is a section on lines 5—5 of Figure 3.

Connected with the T, 13 on the pipe 14, and here is where my improvement begins, is a pipe 20 leading to the carburetor control device 21 shown in detail in Figures 1 to 5. This device comprises an elongated member 22 substantially hemispherical in cross section and presenting a flat side for convenient attachment, by screws or otherwise, to the vertical portion 23 of a bracket 24, which bracket is further provided with laterally extending arms 24 and 25, by which the device is attached to the carburetor 7. As stated, the carburetor is of the usual type, containing the usual butterfly or throttle valve. The shaft 27 of the valve extends outside the carburetor to which I firmly secure by a clamp as shown, a short arm 28 having an elongated aperture 29 therethrough for the passage of flattened portion of the rod 30 whose lower enlarged end 31 is pivoted in the bifurcated end of a connector 32 removably connected with the rod 33 which extends into the cylindrical bore 35 in the member 22. The bore 35 opens at its lower end into a slightly larger bore 36, in which works the piston 37 on the rod 33. In the lower end of the bore 36 is a fitting 38 which receives the carburetor end of the pipe 20. Interposed between the free end of the arm 28 and the upper end of the connector 32, and preferably connected to both, is a spiral spring 39 to assure yielding action between the parts between which it is inserted, in the up and down movements of said rods 30 and 33. In Figure 2, the piston is shown in the position it occupies when the carburetor valve is throttled down as low as it can be with the shown adjustment of the arm 28 on the carburetor valve shaft. Obviously this adjustment may be varied at will.

The compressor governor per se is no part of my invention, and its description need not be gone into in detail to any great extent.

Figure 6:
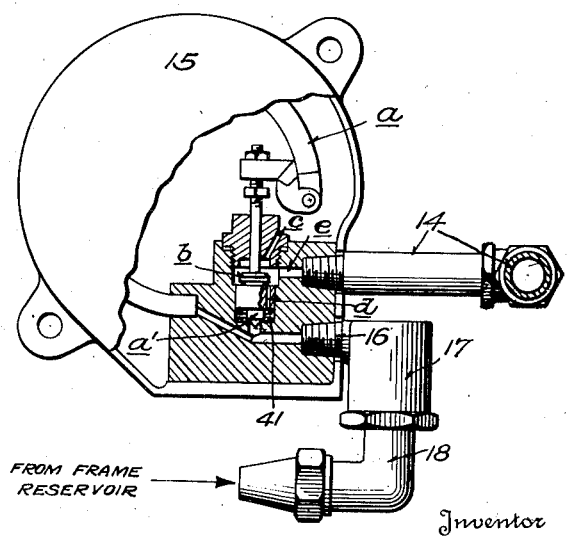
Figure 6 is a schematic view, partly in section, of a compressor governor of known make showing the point at which the element of my improved device is attached.

Air pressure from the reservoir 1 enters the governor through pipe 18 and strainer 17, and is always present in the spring tube a and below the lower valve a', Figure 6. The valve arrangement is such that when the air pressure reaches a maximum setting of the air pressure governor 15 which is indicated by a suitable gauge (not shown) say as stated 125 to 130 pounds, the spring tube load on the upper valve b and the lower valve a' has been reduced enough to raise the upper valve, which movement permits the unsetting of the lower valve a', aided by spring 41. This movement of the upper valve closes the port c permitting pressure to pass through the hole d in the piston-like end of the valve a, and thence through the port e through pipes 14 and 12' to the unloading mechanism of the compressor 8, and through pipe 20 to the carburetor control. When this occurs, the unloading valves in the compressor headed a' are opened and the compressor exhausts to the atmosphere, and further compression is consequently stopped, but the engine, whose speed is controlled by the throttle valves of the carburetor now runs at a reduced speed. Simultaneously with the operation of the unloading valves of the compressor, pressure passes through the pipe 14 to pipe 20 and to bore 36 in the member 22, and operates the piston 37 to reduce the supply of gas by action upon the throttle valve of the carburetor in closing direction, through parts 33 and 30.

When the engine is not compressing or not under load but still running with a constant reduced speed, there still will be air pressure in the reservoir beyond immediate needs, but which is not being used. It is this air pressure or part of it, in excess of immediate needs, that I tap and utilize to control the carburetor throttle valve to throttle down the gas when the engine is not compressing. When the pressure in the reservoir is reduced, the spring tube load on the valves a' and b is increased overcoming the pressure of coil spring 41 permitting the valves to move downwardly, the upper valve opening the exhaust vent c and simultaneously closing the valve a thereby exhausting the pressure in the pipes 20 and 12' through said vent, permitting piston 37 to descend by gravity opening the throttle and admitting more gas to the engine for use while compressing, and permitting closing of the by-pass in the compressor 8.

An adjustable stop 40 is preferably provided to control the extent of throttling movement of the arm 28.

I claim:

1. A pressure-responsive device for use in a compressor unit having an engine provided with a carburetor, a compressor, a fluid pressure tank, fluid pressure means connected with said tank for unloading the compressor, and a pressure-responsive governor operatively connected with said fluid pressure unloading means, comprising a pressure-controlled valve including an arm secured to the shaft of the throttle valve of the said carburetor, a cylinder, and a piston arranged to reciprocate in the said cylinder, the said piston being operatively connected with the said arm whereby the said arm oscillates during the reciprocation of the said piston, and means connecting said pressure-controlled valve with said fluid pressure unloading means through said governor and responsive thereto, whereby the said carburetor is throttled down coincident with the unloading of the said compressor.

2. The structure of claim 1 including resilient thrust-communicating means between the said piston and the said arm.

ERNEST H. SIMPSON.

REFERENCES CITED

The following references are of record in the file of this patent:

UNITED STATES PATENTS

| Number | Name | Date |
|---|---|---|
| 1,550,875 | Carpenter | Aug. 25, 1925 |
| 1,550,964 | Jones | Aug. 25, 1925 |
| 2,137,219 | Aikman | Nov. 22, 1938 |
| 2,171,285 | Baker | Aug. 29, 1939 |
| 2,178,660 | Carpenter | Nov. 7, 1939 |
| 2,361,870 | Rhoads et al. | Oct. 31, 1944 |